June 12, 1951     R. B. VOGT     2,556,487
CONVEYER TROLLEY
Filed Jan. 26, 1946
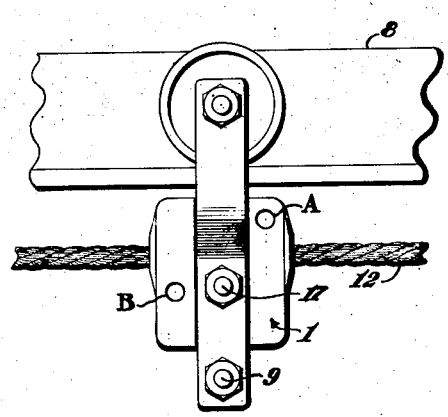
Fig. 2     Fig. 1
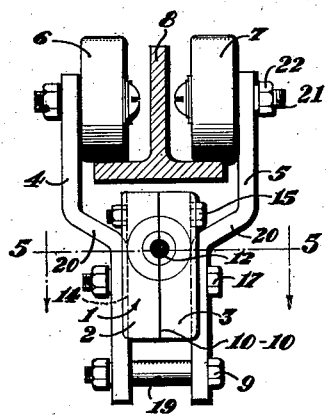
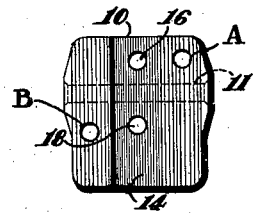
Fig. 3
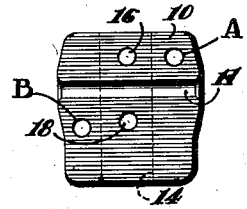
Fig. 4
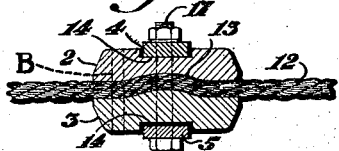
Fig. 5
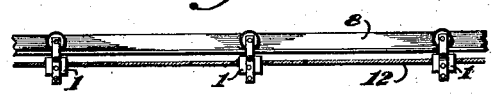
Fig. 7
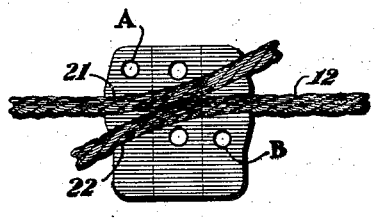
Fig. 6
INVENTOR.
Rudolph B. Vogt
BY
Wood, Arey, Herron & Evans
ATTORNEYS Patented June 12, 1951

2,556,487

UNITED STATES PATENT OFFICE 2,556,487

CONVEYER TROLLEY

Rudolph B. Vogt, Cincinnati, Ohio, assignor to The E. W. Buschman Company, Cincinnati, Ohio, a corporation of Ohio Application January 26, 1946, Serial No. 643,652

10 Claims. (Cl. 198—177)

This invention relates to trolley conveyors comprising a rail or tram and a plurality of interconnected trolleys which are movable along the rail and which provide individual supports for the work pieces to be conveyed from one point to another.

The principal purpose of this invention has been to provide improved conveyor trolleys adapted to be interconnected one with another by means of a flexible wire rope or cable, as distinguished from the chain-like links or elements which are now in conventional use.

A further objective of this invention has been to facilitate connection and disconnection of the trolley elements with the cable in order that they may be spaced accurately with respect to one another, and in order that individual trolleys which may require repair readily may be removed without dismantling the entire cable trolley system.

A still further objective of the invention has been to provide simplified trolley units which are less expensive to construct and less expensive to install than trolleys of the various types now available.

Briefly, in accordance with this invention the trolley units comprise mating sections adapted to be fastened together to form a trolley assembly and adapted, upon assembly, to embrace the cable therebetween and thereby be connected to it. Each trolley section has one or more wheels or skids which track upon the tram rail of the conveyor system and, in the preferred embodiments of this improvement, each trolley section comprises a mounting block arranged for engagement with the cable, and an arm removably associated with the mounting block for supporting a roller or skid element. By virtue of this construction either or both of the trolley roller or skid elements of an assembly may be removed without disconnecting the block from the cable or, at the same time, the sections and associated arms also may be separated from one another if the entire unit is to be dismantled.

The mounting blocks, for attachment thereof to the cable, have mating grooves within which the opposite portions of the cable are embraced. Preferably, these grooves are of tortuous, curved, arcuate or serrated configuration in order that the blocks, when clamped together, find secure purchase on the cable. A conveyor system constructed in accordance with this invention also may utilize a terminal or juncture block, the halves thereof having coextensive grooves respectively for receiving the free ends of the trolley conveyor, whereby they are held together to form a closed cable circuit.

From the foregoing principles upon which the invention is based, and from the following detailed description of the drawings in which apparatus typical of the invention is disclosed, those skilled in the art readily will comprehend various other modifications to which the invention is susceptible.

In the drawings:

Figure 1 is a side elevation of a conveyor trolley, cable, and rail assembly.

Figure 2 is an end elevation of the assembly of Figure 1.

Figure 3 is a side elevation of the outside face of a trolley block mounting, with the other parts removed therefrom.

Figure 4 is a view similar to Figure 3, showing the opposite or cable engaging face of a mating block.

Figure 5 is a sectional view taken on the line 5—5 of Figure 1.

Figure 6 is a view similar to Figure 4 but showing the cable engaging face of a juncture block.

Figure 7 is a somewhat diagrammatic view showing a plurality of the cables arranged in operative relationship to one another on a conveyor rail.

The apparatus shown in the drawings consists essentially of the base block assembly indicated generally at 1, which comprises mating halves 2 and 3 respectively, trolley arms 4 and 5, mounted respectively upon the mating block sections 2 and 3, and rollers 6 and 7 journalled at the upper extremities of the arms. The rollers are located at the inner faces of the arms 4 and 5 and are positioned for rolling engagement with the flanges of an inverted T section 8, the inner faces of the rollers being spaced apart from one another so as to clear the web of the supporting rail. Arms 4 and 5 have portions extending below the block unit 1 where they are arranged, in any suitable manner, to support a conveyor hook or hanger, such as by means of cross bolt 9. Rail 8 of the conveyor system is suspended in any suitable manner by hangers or brackets; inasmuch as such details form no part of the present invention the mounting of the conveyor system, as well as the drive mechanism, are not described.

Block members 2 and 3 are preferably of similar peripheral configuration and are adapted to be mated with one another, i. e., at the inner faces 10—10 thereof. The mating faces 10—10 have grooves 11 therein (Figure 4), these grooves being in alignment with one another and cooperatively defining a passageway for cable 12.

In the preferred structure the grooves are non-linear, that is, as shown in Figure 5, the grooves define a passage which may have an offset 13 therein forming a bight which enables the blocks to bind upon the cable and thereby be fastened securely to it. In place of this construction tortuous shape may be utilized or serrations may be provided in the groove faces though, as a general rule, if serrations are employed they should be of a rounded configuration to avoid pinching the strands of the cable or nicking the strands to such an extent that their strength is weakened.

The exterior faces of the cable blocks 2 and 3 respectively, in the embodiment disclosed, are provided with slots 14 extending laterally with respect to the cable grooves or, that is, vertically with respect to the cable. These grooves are dimensioned to receive and support the arms 4 and 5.

Two bolts, by choice, are used in the fabrication of a trolley assembly. One of these, bolt 15, passes through bores 16 in the mating blocks 2 and 3 at one side of the cable groove 11 and serves the purpose of holding the blocks upon the cable. The other of the bolts, 17, passes through bores 18 in the blocks 2 and 3 at the other side of the cable groove 11 and also passes through apertures in the arms 4 and 5; and thus not only holds the arms 4 and 5 upon the block but additionally supplements bolt 15 to hold the blocks firmly on the cable.

At their lower extremities the arms 4 and 5 extend below the blocks 2 and 3 and may be bored in alignment to receive a cross bolt 9 which preferably is surrounded by a spacer bushing 19 residing in-between the arms so as to keep them from being bent toward one another when the bolt 9 is tightened.

The rail 8 is shown in the form of an inverted T section but may be of H configuration or other suitable shape. Commercial sections of this type usually have flanges of substantial width and, in order to accommodate the dimensional requirements, the upper portions of the arms 4 and 5 are offset from the lower portions thereof, as at 20. In this manner the arms 4 and 5 clear the longitudinal edges of the rail flanges. Rollers 6 and 7, one for each arm, preferably are of the anti-friction bearing type and their inner races are mounted upon stud bolts 21 extending outwardly through bores in the arms 4 and 5 beyond which the stud bolts are fastened in place by means of nuts 22. It is to be noticed also that the offsets 20 in the arms provide clearance for the head and nut respectively of bolt 15 which interconnects the block sections 2 and 3. Each arm may be constructed to support a pair or more of rollers should it be intended to maintain the trolley square with the track at all times.

The "built up" nature of this assembly provides a number of advantages. In the first place duplicate pieces are utilized; hence economical production thereof is facilitated. On the other hand, during conveyor operation over prolonged periods it frequently occurs that a roller wears out or that a bearing must be replaced. In such instances, bolts 9 and 17 are removed and the arms 4 and 5 may then readily be taken down, repaired, or replaced with simple inexpensive repair parts. This operation does not disturb the setting of the block assembly 1 upon the cable and the original accuracy of the spacing of the trolleys with respect to one another, which is necessary to provide their proper meshing with drive cogs of a power drive, is preserved. The repaired arms, or new arm units, are replaced by installation thereof in the face grooves 14 of the blocks and are fastened in position by replacement of bolts 9 and 17. This operation requires but a fraction of the time which heretofore has been required to break the conveyor linkage or the cable at some point, remove the defective trolley from its track, as well as any that precede it, rethread the trolley on the track and all the others that may have been removed, and then reestablish the location of the repaired trolleys with respect to those adjacent.

Moreover, the invention provides the advantage of ready adjustability of spacing of the trolleys with respect to one another. For instance, in initial installation, a number of trolley assemblies, with or without the arms 4 and 5 associated therewith, may be mounted somewhat loosely upon the cable at estimated or approximate spacings, in rapid and convenient manner. The accurate spacings then may be established by moving the trolley assemblies or the blocks thereof, as the case may be, short distances one way or the other to the desired settings.

This feature is of considerable advantage should the cable stretch during usage because, while the blocks are fastened securely to the cable (in effect it is bound between the blocks) still the cable strands are not dented or kinked and the original strength of the cable as well as its linear straightness is not impaired.

As shown in Figure 2, bolt 15, provided to hold the mating sections 2 and 3 in clamped engagement with the cable, is positioned within the hangers 20—20; thus the head and nut of bolt 15 are not readily accessible. In installations of a temporary nature or in installations which may require frequent spacing or respacing of the trolleys on the cable, the inconvenience of dismantling the hangers 20—20 in order to gain access to the head or nut of bolt 15 may be avoided by providing bolts in bores A and B which are spaced at opposite sides of the hanger in the trolley blocks. Bolts disposed through these bores are readily accessible without interference from the hangers. It also will be noted that these bolts are arranged adjacent opposite sides of the mounting blocks and straddle cable 12.

The distortion of a cable, as by passage thereof through an arcuate cavity of the type shown in Figure 5, may, if the cable is of relatively large diameter, tend to warp the cable out of alignment; in such event the cable tends to prevent adjacent unweighted trolleys from hanging perfectly straight. However, whatever warping effect may be caused from this condition can be compensated in an opposite direction by reversely arranging the assemblies on the cable.

A juncture block is shown in Figure 6 which accommodates cable extremities and forms the means of joining these extremities one to the other to form a closed cable circuit. This unit is of the same general type as shown in Figures 3 and 4 and comprises arms 4 and 5 as previously described, but it has mating grooves 21 and 22 therein, the entrance to the grooves 21 and 22 being in longitudinal alignment with one another while the exits of these grooves are offset with respect to the entrances. Thus, groove 21, at the left side of the apparatus, swings upwardly through an arcuate or tortuous path and forms a seat for one end of the cable. Groove 22, for the other end of the cable, enters at a point aligned with the entrance to groove 21 but swings downwardly or tortuously so as to form a seat for the other side of the cable. These offset passageways thus enable the two cable portions to clear one another and at the same time their configuration serves the same purpose as the "bight" configuration of the block shown in Figure 5, that is, binding the cables in place securely when the two juncture block sections are clamped together. In installation, using these juncture blocks, the two cable ends are pulled past one another to obtain the desired tautness in the system, and the mating block sections are then fastened together. After this is done the projecting free ends of the cable may be trimmed away and the juncture block therefore occupies the same space and is accommodated by the same cog spacing as the other trolley units of the conveyor system.

Having described my invention, I claim:

1. A trolley for a conveyor, comprising separable mating sections, at least one of which has a groove therein at the mating face thereof, and the other of which has a mating face effective for clamping a trolley cable disposed within the groove when the sections are clamped together, means for clamping the sections together, into engagement with the cable, said sections respectively having hangers removably associated with the outer faces thereof, independent means for attaching the hangers to the mating sections, and trolley rollers carried respectively by said hangers.

2. A conveyor trolley, comprising mating sections having cooperating grooves therein for the reception therebetween of a trolley cable member, means for fastening said mating sections one to another whereby the sections exert a clamping action on a cable member disposed in said grooves, each of said sections at its outer face having a hanger associated therewith, independent means for attaching the hangers to the mating sections adapting the hangers to be detached without disturbing the clamping action of the mating sections with the cable member, and rollers supported by said hanger means at points spaced from said mating sections.

3. A cable trolley, comprising hangers spaced apart from one another and having rollers in alignment adjacent one extremity thereof, support means at an opposite extremity of said hangers and a cable body disposed between said hangers and removably associated therewith, said cable body comprising separable sections adjoining one another at meeting faces, at least one of which has a groove therein for reception of a cable member and the other of which meeting faces is effective for exerting a clamping action on a cable member disposed within said groove, independent fastening elements for attaching the hangers to the body sections and for clamping the body sections to the cable whereby the hangers may be detached from the body sections without detaching the sections from the cable.

4. A cable trolley, comprising a pair of hangers having rollers in axial alignment adjacent one extremity thereof, said hangers being spaced apart from one another, a cable body disposed between said hangers, means for fastening said cable body to said hangers, said cable body comprising separable sections which are in engagement with one another at meeting faces, at least one of which has a groove therein for reception of a cable member and the other of which is effective for exerting a clamping action on a cable member disposed in said groove, and means separate from the means for fastening the cable to said hangers for joining together the mating sections independently of said hangers, said means adapting the hangers to be detached from the mating sections without detaching the sections from the cable.

5. A cable trolley comprising a pair of cable clamping blocks having cooperating grooves in their inner mating faces arranged to receive a trolley cable member, clamping means extending through the clamping blocks and arranged to clamp the blocks upon the cable member, the outer faces of the clamping blocks having cooperating slots disposed at right angles to the said cooperating grooves, hangers seated respectively in said slots, and fastening means extending through the clamping blocks adapting the hangers to be detached from the blocks without disturbing the clamping engagement of the blocks with the cable member.

6. A cable trolley comprising a pair of clamping blocks having cooperating grooves in their inner mating faces arranged to receive a cable member, the outer faces of the blocks having cooperating parallel slots disposed at right angles to the said cooperating grooves, hangers seated respectively in said slots, a fastening element offset from the cable member and extending crosswise through the blocks to fasten the hangers detachably to the blocks, means on opposite sides of the hangers and straddling the cable for clamping the blocks to the cable, the first mentioned fastening element adapting the hangers to be detached from the blocks without detaching the blocks from the cable member.

7. A trolley for a conveyor as in claim 1 in which at least one of the separable mating sections has contiguous grooves therein at a mating face thereof, and the other has a mating face effective for clamping trolley cable sections disposed within said grooves when the sections are clamped together, and in which the points of entrance to said grooves are in alignment respectively at opposite sides of said sections and the points of outlet of said grooves are laterally offset from the points of entrance.

8. A trolley as in claim 2 comprising mating sections having cooperating grooves therein for the reception therebetween of a trolley cable, the said grooves having respective points of inlet which are in alignment with one another and having points of outlet which are offset from the points of inlet.

9. A cable trolley as in claim 5, in which the cooperating grooves in the cable clamping blocks are configurated to receive the respective terminal portions of a length of cable which is arranged in a loop, each of said grooves having a point of inlet which is in alignment with the point of inlet of the other of said grooves, and the points of outlet of said grooves from said blocks being respectively offset from the points of inlet, whereby the respective cable ends may be held in fixed relationship to one another when the said clamping blocks are clamped upon the cable member.

10. A cable trolley as in claim 6, in which the cooperating grooves in the inner mating faces of said blocks have points of inlet which are in alignment at the opposite ends of the blocks, and have points of outlet from the block which are offset respectively from the points of inlet, thereby enabling the cooperating grooves to receive the endwise portions of a looped cable and enabling the pair of clamping blocks to hold the endwise portions of the cable is fixed relationship to one another when the clamping blocks are clamped together.

RUDOLPH B. VOGT.

REFERENCES CITED

The following references are of record in the file of this patent:

UNITED STATES PATENTS

| Number | Name | Date |
|---|---|---|
| 509,251 | Sheldrick | Nov. 21, 1893 |
| 810,149 | Horst | Jan. 16, 1906 |
| 1,901,850 | Shafer | Mar. 14, 1933 |
| 1,907,894 | Stevens et al. | May 9, 1933 |
| 2,017,404 | Lorig | Oct. 15, 1935 |